Dec. 10, 1940.  C. P. GUTHRIE ET AL  2,224,344
REGENERATOR AND METHOD OF OPERATION
Filed Sept. 10, 1938  2 Sheets-Sheet 1
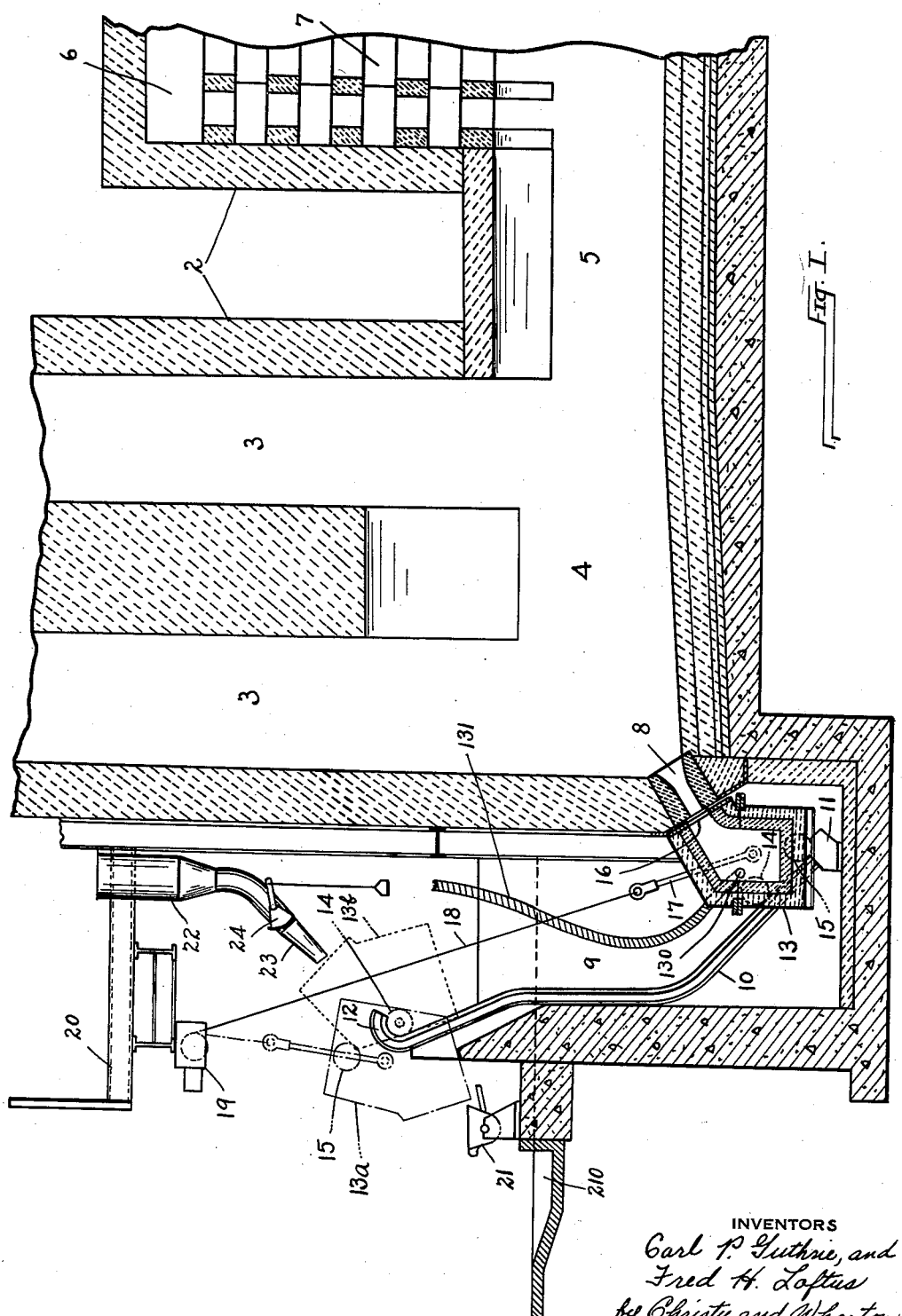

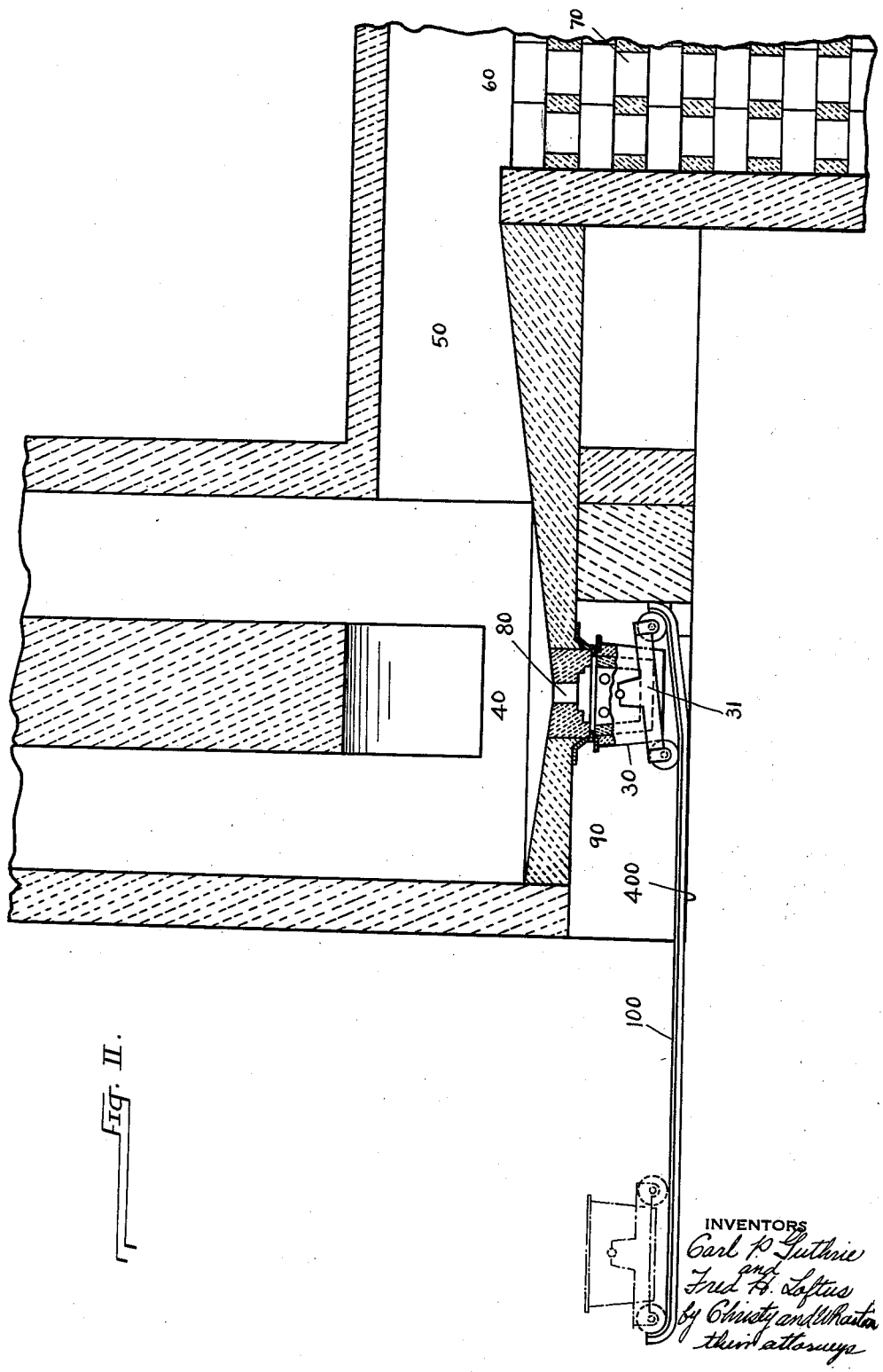

Patented Dec. 10, 1940

2,224,344

UNITED STATES PATENT OFFICE 2,224,344

REGENERATOR AND METHOD OF OPERATION

Carl P. Guthrie, Cleveland, Ohio, and Fred H. Loftus, Mount Lebanon, Pa.

Application September 10, 1938, Serial No. 229,304

3 Claims. (Cl. 263—45)

Our invention relates to regenerators, particularly to the regenerators of metallurgical furnaces, such as open-hearth furnaces used in the production and refinement of steel. More particularly, the invention is directed to the problem of disposing of the molten slag precipitated by the hot waste gases streaming from the furnaces into the regenerators. The invention consists in refinements both in method and in apparatus.

In the accompanying drawings Fig. I is a view in vertical section, showing a regenerator fragmentarily, and illustrating in association therewith apparatus, in which and in the operation of which our invention is realized. Fig. II is a view, comparable with Fig. I, illustrating modifications in regenerator construction and in the means for achieving the ends in view.

In the ensuing specification the invention will be considered as it is applied to and practiced in open-hearth furnaces.

The hot waste gases streaming from the outgo port of an open-hearth furnace carry molten particles of slag, composed in the main of silica ($SiO_2$) and iron oxide ($Fe_3O_4$). For manifest reasons it is desirable to remove such slag from the gases before they enter the checkerwork of the regenerators, and to this end it is customary to provide one or more slag-pockets in the passage or passages extending between the furnace and the regenerators. In known way these slag-pockets are designed to reduce the velocity and change the course of the flowing gases, with the consequence and effect that the entrained slag is precipitated.

In the past the common practice has been to allow the precipitated slag to accumulate and solidify on the bottom of the slag-pocket, until the furnace was shut down for repairs, at which time the accumulated slag was broken up and removed. The job required from three days to a week's time, and the labor costs sometimes ran as high as six hundred dollars per furnace. Additionally, the work usually resulted in damage to the refractory brickwork.

In seeking to avoid this objectionable circumstance of open-hearth furnace operation, it has hitherto been proposed that the slag be kept fluid and drained from the slag-pockets of the furnace while the furnace is in service, and to such end it has been suggested that slag receivers be positioned at the mouth of an outlet in the floor of each slag pocket. Additionally, one inventor has proposed that the slag-pockets be so far elaborated in structure as to provide a fire-box, in which fuel may be burned, to keep the precipitated slag in desired condition of fluidity.

In refinement of these proposals, we provide a travelling fire-box—a refractory lined vehicle in which fuel may be burned, and which may be positioned over the drainage opening of a slag-pocket and removed at will. In service such fire-box maintains the drainage opening and the adjacent walls of the slag-pocket at desired elevated temperature, and, additionally, provides an independently heated receptacle in which the draining slag may be collected and maintained in fluid state. By virtue of our invention the slag-pockets of a furnace may be of simple construction, with minimum departure from prevailing internal design, and yet all of the advantages sought by the highly specialized slag-pocket structures hitherto proposed may be enjoyed, with still other advantages that will appear in the ensuing specification.

An embodiment of the invention is illustrated in Fig. I. The reference numeral 2 indicates the side walls of a typical regenerator, which in accordance with usual practice are constructed of refractory masonry, reinforced and tied with structural steel. The customary gas passage-ways 3 extend downward from the port of the furnace (not shown), and at their lower ends open into the usual slag-pocket 4; and a horizontal passage 5 opens from the slag-pocket into a chamber 6 including a body of checkerwork 7. In accordance with usual practice the regenerator may include several checkerwork chambers, but it is to be understood that our invention is not primarily concerned either with the number or the arrangement of such chambers.

It may be noted that the passage 5 opens from the slag-pocket into the bottom of the chamber 6, and it is by reason of such feature that the structure of Fig. I is known as an underflow regenerator.

In service the hot slag-laden gases descend from the outgo port of the furnace, through passageways 3, to the slag-pocket 4; from the slag-pocket the gases stream through passage 5 into the bottom of chamber 6, whence they flow upward and proceed through the regenerator, yielding on their way stores of heat to the refractory bodies of which the checkerwork 7 is formed. In the course of such flow the molten particles of slag, carried by the gases leaving the furnace, are in known way precipitated in the slag-pocket.

We provide a pit 9 adjacent to the vertical side wall of the slag-pocket, and in such wall the slag-draining passage is provided, opening from the bottom of the slag-pocket into the pit, as shown at 8. A vertically extending runway is provided in the pit, for the travel of a fire-box 13 between alternate positions. Advantageously, the runway consists in a pair of rails 10, extending upward from a base 11 at the bottom of the pit, and terminating at the top of the pit in an abutment 12, which in this case is formed by sharply curving the upper ends of the rails. The fire-box is constructed in the form of a skip-bucket adapted to travel on the rails on two pairs of wheels 14 and 15. The fire-box is made in the form shown, lined with refractory, and provided with a mouth 16 that is inclined to the vertical axis of the box. The box is provided with a bail 17, and a cable 18 extends from the bail to an electric winch 19 mounted on a suitable superstructure 20 above the pit. The winch and cable provide means for moving the fire-box upward on the rails.

It is important to note that, adjacent to outlet passage 8, the external wall of the slag-pocket is inclined, in such manner that the inclined mouth of the fire-box may seat snugly thereagainst, to prevent the infiltration of cool air from the pit into the passage, it being understood that desirably the temperature of the passage 8 and of the chamber within the fire-box is kept well above the temperature at which the slag congeals and freezes.

As already mentioned, it has hitherto been proposed to burn coke or other fuel in the bottom of a slag-pocket, in order to maintain the slag accumulating in the bottom of the pocket in fluid condition. Without questioning the advantages to be gained by the use of heat at the bottom of a slag-pocket, we may note certain objections to such proposal. Manifestly, it is objectionable to produce fuel ash in the bottom of a slag-pocket, for such ash only increases the bulk of the material which must be maintained in molten condition and removed. Furthermore, considerable time, labor and supervision are required to introduce and maintain an adequate bed of burning coke within the slag-pocket. And it may be added that it is practically impossible during furnace operation to inspect conditions within the slag-pocket.

In accordance with our invention we burn fuel in the fire-box 13—an independent removable structure—seated over the drainage opening 8 of the slag-pocket. In this case we charge the fire-box with coke and fire it. The burning coke heats the interior of the fire-box and holds it at a temperature well above that at which the slag freezes. The flames and hot gases generated by the burning coke rise and play in the outlet passage 8, and heat the walls of such passage and the adjacent walls of the slag-pocket, with the consequence that the slag precipitated in the slag-pocket is at all times maintained sufficiently fluid.

The charge of coke is, advantageously, introduced to the fire-box when it is removed from the slag outlet. To this end we provide above the pit 9 a coke hopper 22, whose outlet consists in a spout 23 controlled by a gate 24. The fire-box is elevated on the rails 10 to the position indicated in dotted lines 13b, with the mouth of the box positioned at the delivery end of the spout 23, and then the gate 24 is opened and the fire-box charged with coke. And then the charged bucket is lowered into service position.

Preferably, the combustion is by restricting the entrance of air retarded; that is, insufficient air is introduced to the fire-box for normal combustion of the coke. Thus, the combustion period is prolonged, and brought into proper timing with the rate of slag delivery from the slag-pocket. In this case we provide one or more inlets 130 in the wall of the box for the admission of air, and by designing the inlets with proper effective area, the desired quantity of air will under natural draft flow into the box. In refinement, we may connect an air blower (not shown) to the inlet 130, say by means of a flexible metal hose 131 and in known way the delivery of air through the hose may be regulated.

Advantageously, our travelling fire-box is adapted to serve as a receptacle for the slag draining from the slag-pocket, and advantageously such fire-box provides a receptacle external to the slag-pocket in which the draining and accumulating slag is held in molten condition. In the normal operation of the furnace the molten slag, precipitated from the flowing gases and falling to the floor of the slag-pocket, drains continuously into the fire-box. By virtue of the insulated walls of the box, and the relatively close fit of the mouth of the box over the outlet passage 8, the slag draining thereinto is kept in molten condition; that is to say, heat losses and infiltration of cool external air are so far inhibited that the heat of the gases flowing through the slag-pocket, plus the heat generated within the fire-box, is effective to maintain the walls of passage 8 and the chamber within the box at a temperature above that at which the slag freezes.

The fire-box is from time to time removed from outlet 8 and dumped, then recharged with coke (if coke rather than gas or oil is the fuel).

Turning again to a consideration of the hoisting means, it will be understood that the structure and organization of the fire-box and rails are such that when tension is powerfully applied to the cable 18, the fire-box first is automatically freed from engagement with the mouth of passage 8, and then is drawn upward on the rails 10. When the ascending fire-box reaches the top of the pit, the wheels 14 come to abutment upon crooks 12 formed in the ends of the rails, and the ascent is arrested; upon the continued winding in of the cable upon the winch, the fire-box is tilted on the axis of wheels 14 into the position indicated in broken lines 13a, and in such tilted position the fluid slag in the box is discharged. A cinder-pot, ladle, or other receptacle may be provided at the head of the pit to receive the discharged slag.

When the contents of the box have thus been dumped, the box is swung into dotted line position 13b and recharged with coke; then the cable 18 is paid out, and the box descends to normal position at the bottom of the rails. Due to the particular inclination of the lower ends of the rails, the fire-box moves automatically into snugly seated position against the external wall of the slag-pocket, with the mouth of the box in proper registry with the passage 8. And it is noteworthy that gravity, effective on the box resting on the inclined rails, operates to secure the box in such position.

The slags of the usual metallurgical furnaces include metal oxides, and in the case of open-hearth furnaces the iron oxide in the slag often runs as high as 60% of the slag by weight. We have found that by burning the coke in the fire-box in an insufficient quantity of air, an oxide-reducing atmosphere is provided. The iron oxide included in the slag draining into the bucket and through the body of burning coke is reduced to metallic iron, just as a blast furnace iron ore is reduced to metal. Thus by the practice of our invention the usual iron losses in the slag may be eliminated. The iron settles to the bottom of the box, and the lighter residuum floats on top.

In order to separate the iron from the undesired residue, we provide a ladle or mold 21 at the head of the pit. When the bucket is dumped into such ladle, the iron settles to the bottom of the ladle, displacing the slag—the slag overflows and falls into a pit 210 or other suitable receptacle. In this way we reclaim upwards of 500 pounds of metallic iron per furnace day.

It is contemplated that, by increasing the rate of combustion and in consequence the temperature in the fire-box at the mouth of outlet 8, while still retaining the reducing atmosphere, we may reduce some of the silica in the slag along with the iron oxide, with the consequence that silicon iron will be produced.

In the operation of the apparatus as described, the method of our invention is practiced.

The features of our invention may be enjoyed in apparatus widely varied from that described above, and in exemplary way permissive modifications are shown in Fig. II. In this case the slag-pocket 40 communicates, by way of passage 50, with regenerator chamber 60, and it will be noted that waste gases enter such chamber above the body of checkerwork 70. (This structure is known as an overflow regenerator.) The outlet port or passage 80 of this regenerator is formed in the floor of the slag-pocket, and the fire-box consists in a refractory lined ladle 30 mounted on trunnions in a carriage 31 that is adapted to travel on a railway 100. In keeping with the features of the structure first described, the mouth of the ladle 30 normally seats over the mouth of the slag outlet 80, as shown. The railway extends into a tunnel 90 beneath the floor of the slag-pocket; the ladle-supporting carriage is adapted to travel outward from the tunnel to the position indicated in broken lines, in which position the ladle proper may be picked up by a crane and dumped; and it will be noted that the inner ends of the rails are inclined in such manner that the carriage, moved from the outer ends of the railway and advanced to service position, rises on the incline and lifts the ladle into snug engagement with the portion of the slag-pocket floor surrounding the passage 80. Thus the receptacle or ladle is adapted, upon movement beneath the slag-product, automatically to seat in proper registry with the slag-delivering passage.

Manifestly, coke may be readily charged into the receptacle 30, when it is at the outer end of the railway, and it will be obvious that the advantages described in the operation of the apparatus of Fig. I may be also obtained in this modified apparatus.

There remains to be considered specific refinements in the structure of the slag-pocket itself, and it is noteworthy that these refinements will prove valuable in any slag-pocket that is to be drained, whatever be its structure and organization.

In the first place it is important to note that the floor of the slag-pocket 40 is really a false floor or horizontal partition arranged above the usual or normal floor level 400. The upper surface of this floor is dished, and the slag outlet 80 is located in the center of the dish, spaced a substantial interval from the vertical side walls of the slag-pocket and preferably in the center of its floor area, where the heat losses through the walls of the structure are least and the temperature established by the hot flowing gases greatest. By so building the floor of the slag-pocket at higher relative elevation, and thus decreasing the height of the chamber within the pocket, and by so organizing the outlet 80 away from the side walls, the hot gases flowing through the slag-pocket are caused, in conjunction with the burning fuel in the ladle, to keep the precipitated slag molten and to keep the outlet at a temperature above the freezing point of the slag.

We claim as our invention:

1. In combination with a regenerator, a pit extending downward adjacent to the vertical wall of said regenerator, a runway extending downward into said pit, a slag-delivering passage opening from said regenerator into said pit, a skip-bucket arranged to receive molten slag from said outlet, said skip-bucket being normally supported at the lower end of said runway with its mouth in registry with the passage opening from said regenerator, and means for elevating said skip-bucket on the runway.

2. In the operation of an open-hearth furnace including a slag-pocket in which molten slag is deposited by the hot waste gases of the furnace, and an outlet for the drainage of molten slag from such slag-pocket, the method herein described which comprises covering the mouth of said outlet with an externally applied fire-box and employing such firebox as a receptacle in which to receive and accumulate molten slag draining from the slag-pocket through said outlet, and, by the combustion of fuel within said external fire-box, heating the mouth of said outlet and the body of accumulated slag within said fire-box to a temperature well above the freezing point of the slag, and from time to time removing the fire-box from said outlet to a point of slag disposal and pouring out the accumulated slag.

3. A furnace regenerator including an outlet for molten slag yielded by the hot waste gases flowing through the regenerator in the course of normal furnace operation, and a traveling fire-box normally positioned externally over the mouth of said outlet and charged with burning fuel for sustaining combustion externally of said mouth of the outlet, said fire-box providing an independently heated receptacle for the molten slag draining from the regenerator through said outlet.

CARL P. GUTHRIE.
FRED H. LOFTUS.